United States Patent
Chen et al.

(10) Patent No.: US 9,024,932 B2
(45) Date of Patent: May 5, 2015

(54) DC-DC CONVERTER WITH AUTO-SWITCHING BETWEEN PWM AND PFM AND OLED DISPLAY USING THE SAME

(75) Inventors: Lin-Chien Chen, Hsin Chu County (TW); Ming-Chien Li, Yun Lin County (TW)

(73) Assignee: Orise Technology Co., Ltd., Hsinchu (TW)

( * ) Notice: Subject to any disclaimer, the term of this patent is extended or adjusted under 35 U.S.C. 154(b) by 814 days.

(21) Appl. No.: 12/836,362

(22) Filed: Jul. 14, 2010

(65) Prior Publication Data

US 2011/0025673 A1 Feb. 3, 2011

(30) Foreign Application Priority Data

Jul. 31, 2009 (TW) ............................... 98125779 A (51) Int. Cl.
- *G09G 5/00* (2006.01)
- *H02M 3/156* (2006.01)
- *G09G 3/20* (2006.01)
- *G09G 3/32* (2006.01)

(52) U.S. Cl.
CPC .................. *H02M 3/156* (2013.01); *G09G 3/20* (2013.01); *G09G 3/3208* (2013.01); *G09G 2330/02* (2013.01); *G09G 2360/16* (2013.01)

(58) Field of Classification Search
CPC ........ H02M 3/156; G09G 3/20; G09G 3/3208; G09G 2360/16; G09G 2330/02; G09G 3/30; G06F 3/038
USPC ................................................ 345/85, 211, 76
See application file for complete search history.

(56) References Cited

U.S. PATENT DOCUMENTS

| | | | |
|---|---|---|---|
| 5,568,044 A * | 10/1996 | Bittner | 323/272 |
| 7,173,404 B2 * | 2/2007 | Wu | 323/283 |
| 2004/0222954 A1 * | 11/2004 | Lueder | 345/87 |
| 2005/0030267 A1 * | 2/2005 | Tanghe et al. | 345/82 |
| 2009/0206814 A1 * | 8/2009 | Zhang et al. | 323/284 |

* cited by examiner

*Primary Examiner* — Ram Mistry
(74) *Attorney, Agent, or Firm* — Muncy, Geissler, Olds & Lowe, P.C.

(57) ABSTRACT

A DC-DC converter with auto-switching between pulse width modulation (PWM) and pulse frequency modulation (PFM) is used in an organic light emitting diode (OLED) display and judges power consumption of an OLED array of the display according to display data of the display and thus determines a switching time between PWM and PFM. The converter comprises a content statistic unit, an auto-switching control unit, a PWM controller, a PFM controller and a power generator. The content statistic unit receives and accumulates the display data of the OLED display and then outputs a statistic value. The auto-switching control unit outputs a control signal according to the statistic value to control the PWM controller and the PFM controller and to switch to a PWM mode or a PFM mode.

4 Claims, 7 Drawing Sheets

DC-DC CONVERTER WITH AUTO-SWITCHING BETWEEN PWM AND PFM AND OLED DISPLAY USING THE SAME

This application claims priority of No. 098125779 filed in Taiwan R.O.C. on Jul. 31, 2009 under 35 USC 119, the entire content of which is hereby incorporated by reference.

BACKGROUND OF THE INVENTION

1. Field of the Invention

The invention relates to a DC-DC converter with auto-switching between pulse width modulation (PWM) and pulse frequency modulation (PFM), and more particularly to a DC-DC converter, which has auto-switching between PWM and PFM, is applied to an organic light emitting diode (OLED) display and selects a PWM mode or a PFM mode according to display data of the display.

2. Related Art

An organic light emitting diode (OLED) display displays a frame using light emitting elements. The OLED display also displays the frame according to the brightness differences generated by different currents flowing through the pixels. The current of each pixel varies with the variation of the displayed frame, the difference between the maximum power consumption and the minimum power consumption of the OLED module is significantly great. It is a great challenge to provide the stable power for the OLED module, such as the power with the small ripple, without lowering the efficiency.

The DC-DC converter has two modulation methods including pulse width modulation (PWM) and pulse frequency modulation (PFM). As for the efficiency, PWM is suitable for the condition of great current loading, while PFM is suitable for the small current loading. Most DC-DC converters use the single modulation method, and some DC-DC converters judge the switching between PWM and PFM according to the magnitude of the current loading. However, it is not an easy issue to switch between PWM and PFM according to the magnitude of the current loading.

Figure 1:
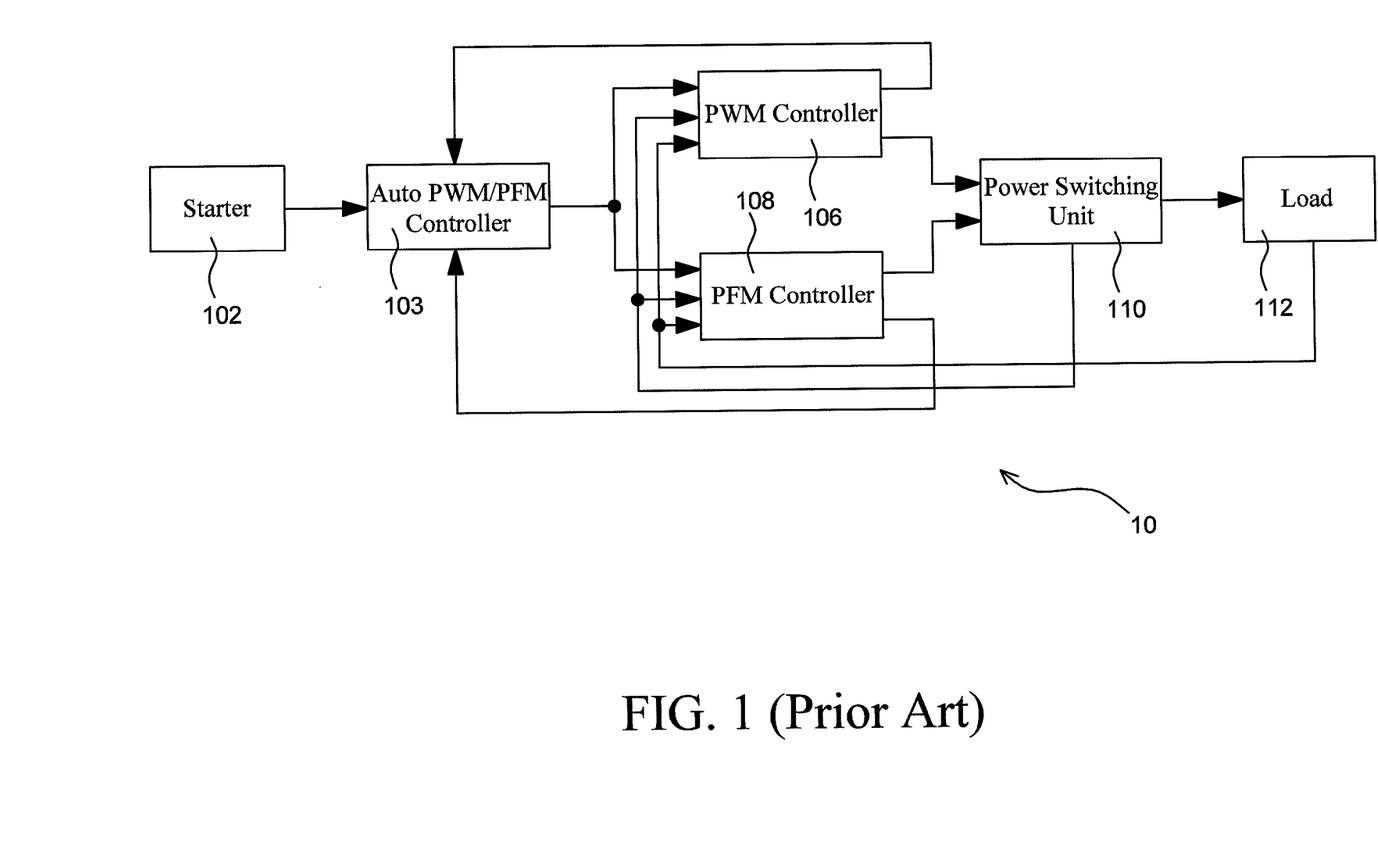
FIG. 1 shows the conventional architecture of a DC-DC converter with auto-switching between PWM and PFM.

The technology of auto-switching between the PWM and PFM operation modes using in the DC-DC converter will be described in the following. Referring to FIG. 1, the auto-switching DC-DC converter 10 disclosed in U.S. Pat. No. 7,173,404 includes a starter 102, an auto PWM/PFM controller 103, a PWM controller 106, a PFM controller 108 and a power switch unit 110. The load 112 in this drawing may be an OLED module of an OLED display.

The starter 102 transmits a starting-enabling signal to the auto PWM/PFM controller 103 to enable the auto PWM/PFM controller 103. Thereafter, the PWM controller 106 and the PFM controller 108 respectively transmit feedback signals to the auto PWM/PFM controller 103. The auto PWM/PFM controller 103 generates a select signal according to the feedback signals of the PWM controller 106 and the PFM controller 108, and outputs the select signal to the PWM controller 106 and the PFM controller 108. So, the auto PWM/PFM controller 103 enables the PWM controller 106 or the PFM controller 108 according to the select signal. The enabled controller (PWM controller 106 or PFM controller 108) outputs a control signal to the power switch unit 110. Thus, the power switch unit 110 switches and outputs a DC power to the load 112 according to the control signal. Meanwhile, the load 112 also transmits another feedback signal to the PWM controller 106 and the PFM controller 108.

Therefore, the auto-switching DC-DC converter 10 controls the power switching in a close loop manner. In general, the close loop control mode is more complicated. So, the cost is higher.

SUMMARY OF THE INVENTION

In view of the above-identified problems, it is therefore an object of the invention to provide a DC-DC converter, which has auto-switching between PWM and PFM and selects a PWM or PFM mode according to display data in an OLED display.

To achieve the above-identified object, the invention provides a DC-DC converter with auto-switching between PWM and PFM. The converter includes a content statistic unit, an auto-switching control unit, a PWM controller, a PFM controller and a power generator. The content statistic unit receives and accumulates display data of the OLED display and then outputs a statistic value. The auto-switching control unit outputs a switch control signal according to the statistic value. The switch control signal has a first state and a second state. The PWM controller receives the switch control signal, and outputs a PWM power when the switch control signal is in the first state. The PFM controller receives the switch control signal, and outputs a PFM power when the switch control signal is in the second state. The power generator respectively receives the PWM power and the PFM power and thus outputs one of the PWM power and the PFM power as a power voltage.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The DC-DC converter with the PWM/PFM auto-switching and the OLED display using the converter will be described with reference to the accompanying drawings.

According to the characteristic of the technology of the OLED module, the brighter pixel consumes more power. So, the power-consumption difference between the fully black frame and the fully white frame of the OLED module is very large. Based on this power-consumption property, the efficiency of the DC-DC converter may be improved by performing the proper switching between PWM and PFM so that the power consumption of the OLED display can be lowered. The typical DC-DC converter only can perform the switching between PWM and PFM according to the magnitude of the current loading at the loading end. However, the OLED display driver with the built-in DC-DC converter can obtain the contents to be displayed by the OLED display. So, the DC-DC converter of the invention judges the power consumption of the OLED array according to the display data, and thus determines the switching time between PWM and PFM.

Figure 2:
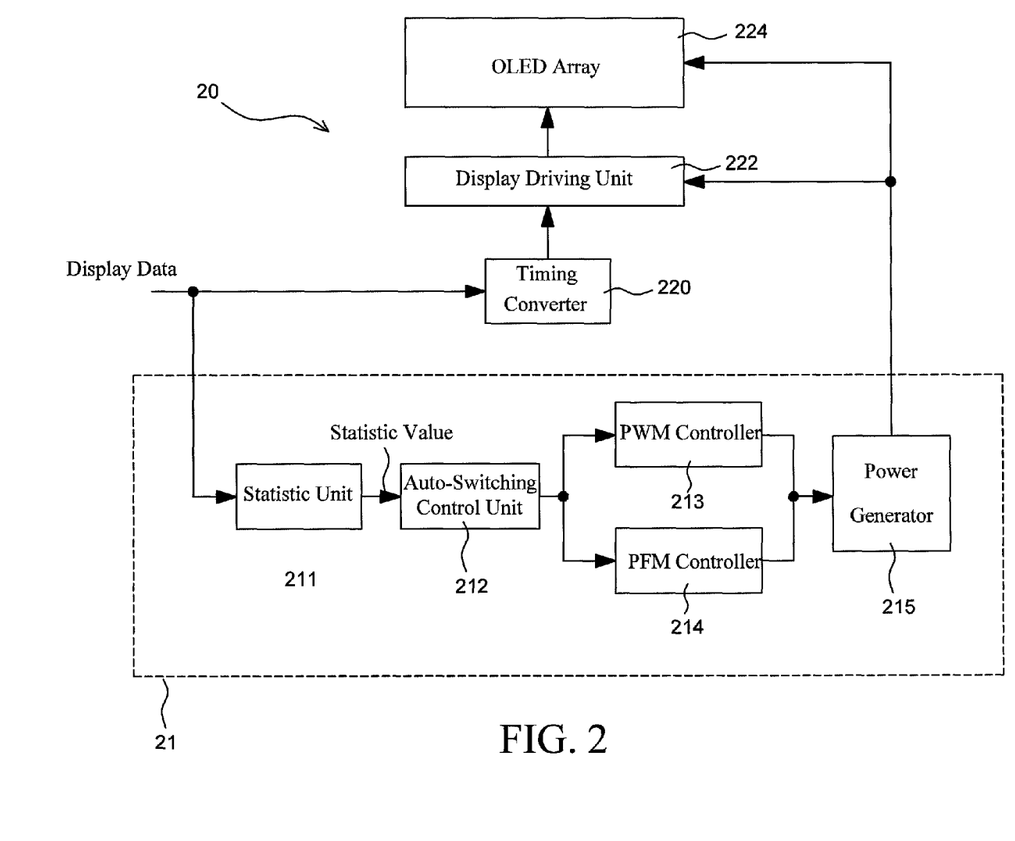
FIG. 2 shows the circuit block diagram of a DC-DC converter with auto-switching between PWM and PFM according to a first embodiment of the invention.

FIG. 2 shows the circuit block diagram of an OLED display 20 with a built-in DC-DC converter according to a first embodiment of the invention. Referring to FIG. 2, the OLED display 20 includes a DC-DC converter 21 with auto-switching between PWM and PFM, a timing converter 220, a display driving unit 222 and an OLED array 224. The timing converter 220 receives display data, and adjusts a timing of the display data, and then outputs the display data to the display driving unit 222. Thereafter, the display driving unit 222 drives the OLED array 224. Because the timing converter 220, the display driving unit 222 and the OLED array 224 are the typical architectures of the OLED display, detailed descriptions thereof will be omitted.

The DC-DC converter 21 with auto-switching between PWM and PFM of the invention includes a statistic unit 211, an auto-switching control unit 212, a PWM controller 213, a PFM controller 214 and a power generator (or power generating unit) 215. The statistic unit 211 receives the display data of the OLED display 20, accumulates the display data and then outputs a statistic value. In general, the statistic unit 211 accumulates the data of each display frame and then outputs the statistic value. The auto-switching control unit 212 determines the control mode to be used according to the statistic value outputted from the statistic unit 211, and outputs a mode control signal. When the statistic value is greater, it represents that the display frame is brighter, and the OLED display has the higher power consumption. So, the PWM mode is adopted. On the contrary, when the statistic value is smaller, it represents that the display frame is darker, and the OLED display has the lower power consumption. So, the PFM mode is adopted. The PWM controller 213 and the PFM controller 214 receive the mode control signal, and then output a PWM power and a PFM power to the power generator 215. The power generator 215 receives the PWM power and the PFM power, then provides one of the PWM power and the PFM power to the display driving unit 222 and the OLED array 224.

Figure 3:
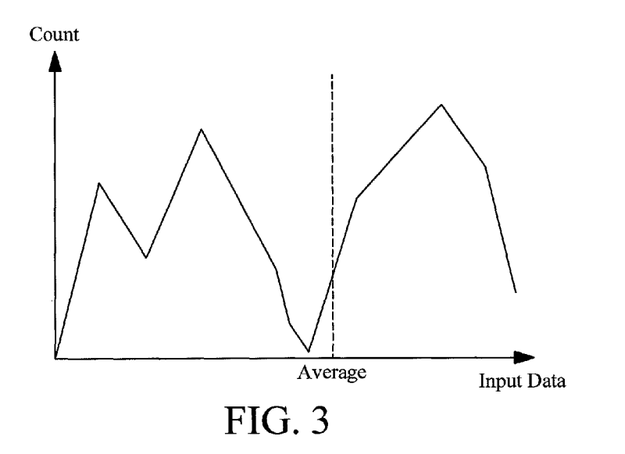
FIG. 3 is a schematic illustration showing a statistic table of input data of one frame.

FIG. 3 is a schematic illustration showing a statistic table of input data of one frame. As shown in FIG. 3, the transversal coordinate represents the input data, and the longitudinal coordinate represents the count value, wherein the count values are summated and divided by the data quantity to obtain an average. The current load of the OLED array may be roughly predicted according to the average so that the suitable control mode may be selected. For example, the PWM mode is suitable for the condition of the higher current load, and the PFM mode is suitable for the lower current load. Although the average is generated in this statistic table, it is possible to make the judgement directly according to the statistic value in practice.

Figure 4:
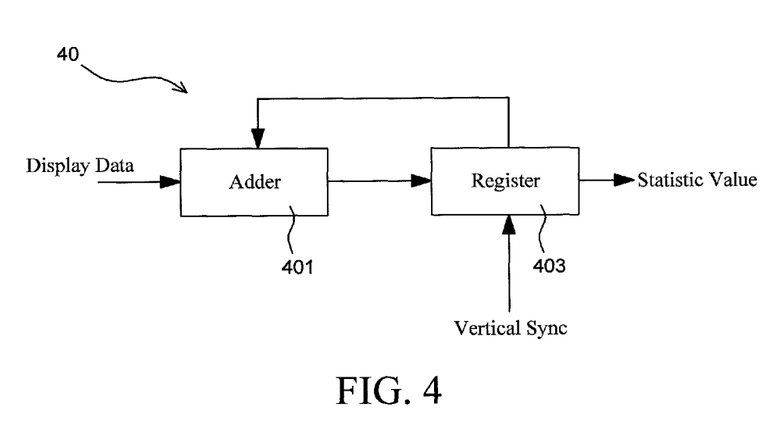
FIG. 4 shows the architecture of a statistic unit according to a first embodiment of the invention.

FIG. 4 shows the architecture of a statistic unit 40 according to the first embodiment of the invention. Referring to FIG. 4, the statistic unit 40 includes an adder 401 and a register 403. The adder 401 adds each display data to the temporarily stored value of the register 403 to generate an added value, and then stores the added value back to the register 403. The statistic unit 40 outputs the temporarily stored value of the register 403 as the statistic value after the vertical sync signal is enabled, and then clears the register 403. Thus, the auto-switching control unit 212 can compare the statistic value with a threshold value, and outputs the mode control signal. That is, when the statistic value is greater than the threshold value, the mode control signal is the high level signal so that the PWM mode is adopted. When the statistic value is smaller than the threshold value, the mode control signal is the low level signal so that the PFM mode is adopted.

Figure 5:
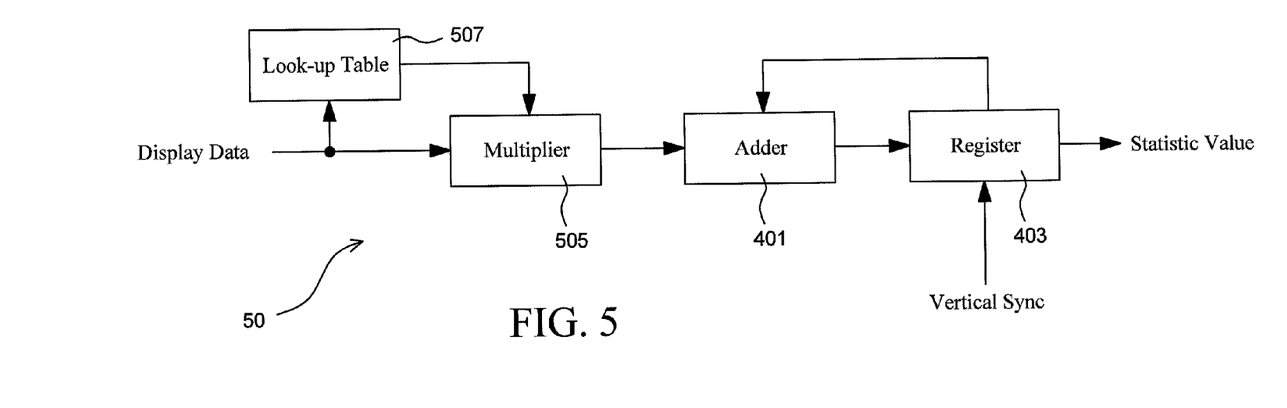
FIG. 5 shows the architecture of a statistic unit according to a second embodiment of the invention.

FIG. 5 shows the architecture of a statistic unit 50 according to a second embodiment of the invention. Referring to FIG. 5, the statistic unit 50 includes a multiplier 505, a look-up-table 507, an adder 401 and a register 403. In practice, the pixel value of the display data of the OLED array is not directly proportional to its actually consumed current. Thus, the look-up-table 507 is utilized to record the weighting of the actually consumed current of each pixel value in this embodiment. So, the statistic unit 50 utilizes the multiplier 505 to multiply the display data by a weighting and then outputs the multiplied product to the adder 401 so that the statistic unit can reflect the actual state much more. The architectures of the adder 401 and the register 403 are the same as those of the statistic unit 40 of the first embodiment, so detailed descriptions thereof will be omitted.

Figure 6:
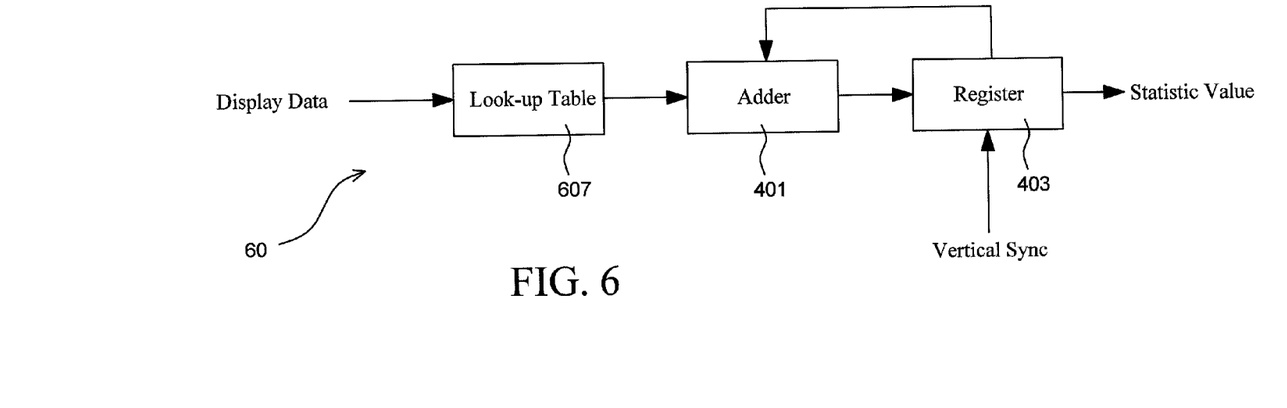
FIG. 6 shows the architecture of a statistic unit according to a third embodiment of the invention.

FIG. 6 shows the architecture of a statistic unit 60 according to a third embodiment of the invention. Referring to FIG. 6, the statistic unit 60 includes a look-up-table 607, an adder 401 and a register 403. In practice, the pixel value of the display data of the OLED array is not directly proportional to its actually consumed current. So, the look-up-table 507 is utilized to record relative values of the actually consumed currents corresponding to different pixel values in this embodiment. Thus, the statistic unit 60 adopts the look-up-table 607 to convert the pixel values of the display data into the relative values of the actually consumed current, and then outputs the relative values to the adder 401. The architectures of the adder 401 and the register 403 are the same as those of the statistic unit 40 of the first embodiment, so detailed descriptions thereof will be omitted.

Figure 7:
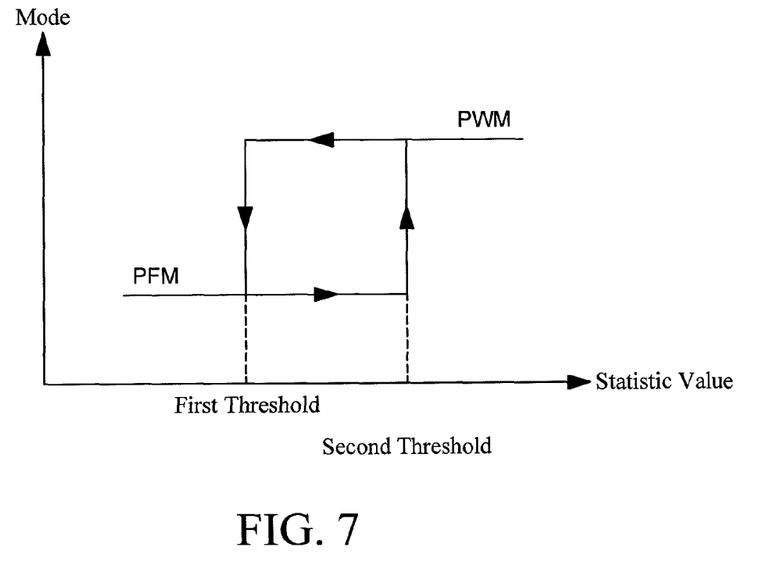
FIG. 7 is a schematic illustration showing an aspect of the invention.

Furthermore, the auto-switching control unit 212 of the invention may be implemented in two aspects. In the first aspect, the judgement is made according to a single threshold value. That is, the auto-switching control unit 212 only sets one threshold value, and switches to the PWM mode when the statistic value is greater than or equal to the threshold value; or otherwise switches to the PFM mode when the statistic value is smaller than the threshold value. In the second aspect, the judgement is made according to two threshold values. In order to prevent to switch between different modes frequently, the judgement method similar to the Smitt trigger may be adopted. FIG. 7 is a schematic illustration showing this aspect of the invention. That is, two threshold values, such as the first threshold value and the second threshold value shown in FIG. 7, are set. When the current mode is the PFM mode, then the mode cannot be switched to the PWM mode until the statistic value exceeds the second threshold value. When the current mode is the PWM mode, then the mode cannot be switched to the PFM mode until the statistic value is smaller than the first threshold value. Thus, if the second switching method based on the two threshold values is adopted, the auto-switching control unit 212 maintains the current mode when the statistic value ranges between the first threshold value and the second threshold value.

In addition, the statistic value of the frame cannot be outputted from the statistic unit until the statistic unit has completely received the data of one frame. Thus, PWM/PFM switching of the OLED display with the built-in DC-DC converter according to the first embodiment lags behind the displaying of the contents by the time of one frame. For example, when the frame rate is 60 Hz, then the switching time needs 1/60 seconds to select PWM/PFM. According to the continuity of the typical frames, the delay of 1/60 seconds cannot affect the switching performance of the DC-DC converter of the invention.

Figure 8:
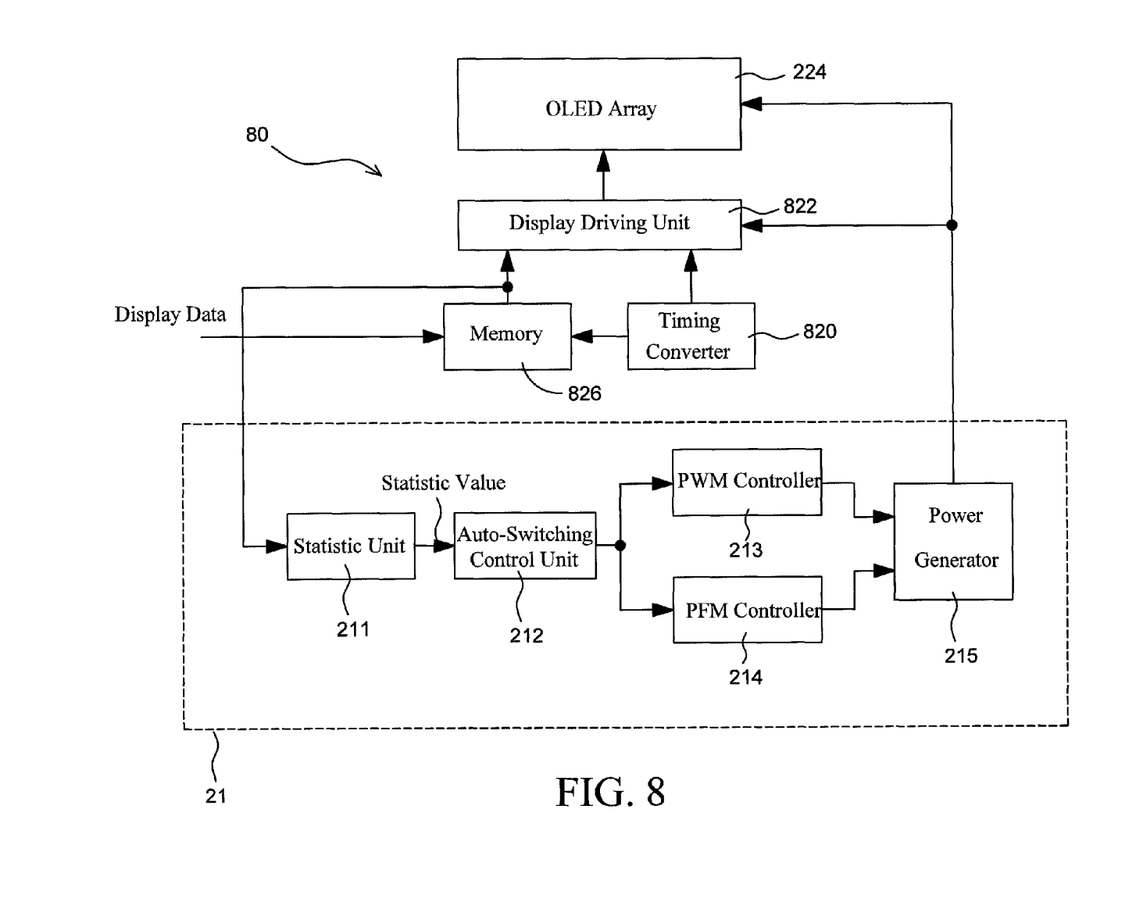
FIG. 8 shows the architecture of an OLED display with the built-in DC-DC converter according to the second embodiment of the invention.

FIG. 8 shows the architecture of an OLED display 80 with the built-in DC-DC converter according to the second embodiment of the invention. Referring to FIG. 8, the OLED display 80 includes a DC-DC converter 21 with auto-switching between PWM and PFM, a timing converter 820, a display driving unit 822, a memory 826 and an OLED array 224. The DC-DC converter 21 of this embodiment is the same as the DC-DC converter 21 of the OLED display 20 of the first embodiment, so detailed descriptions thereof will be omitted. However, the DC-DC converter 21 of this embodiment receives the data outputted from the memory 826. The OLED display 80 of this the embodiment mainly has the added memory 826. The memory 826 receives and stores the display data. The timing converter 820 outputs a control signal to the memory 826 and the display driving unit 822 so that the memory 826 outputs the data to the display driving unit 822, and the display driving unit 822 drives the OLED array 224 according to the received data. Because the timing converter 820, the memory 826, the display driving unit 822 and the OLED array 224 have the architectures that can be found in the typical OLD display, detailed descriptions thereof will be omitted.

Figure 9:
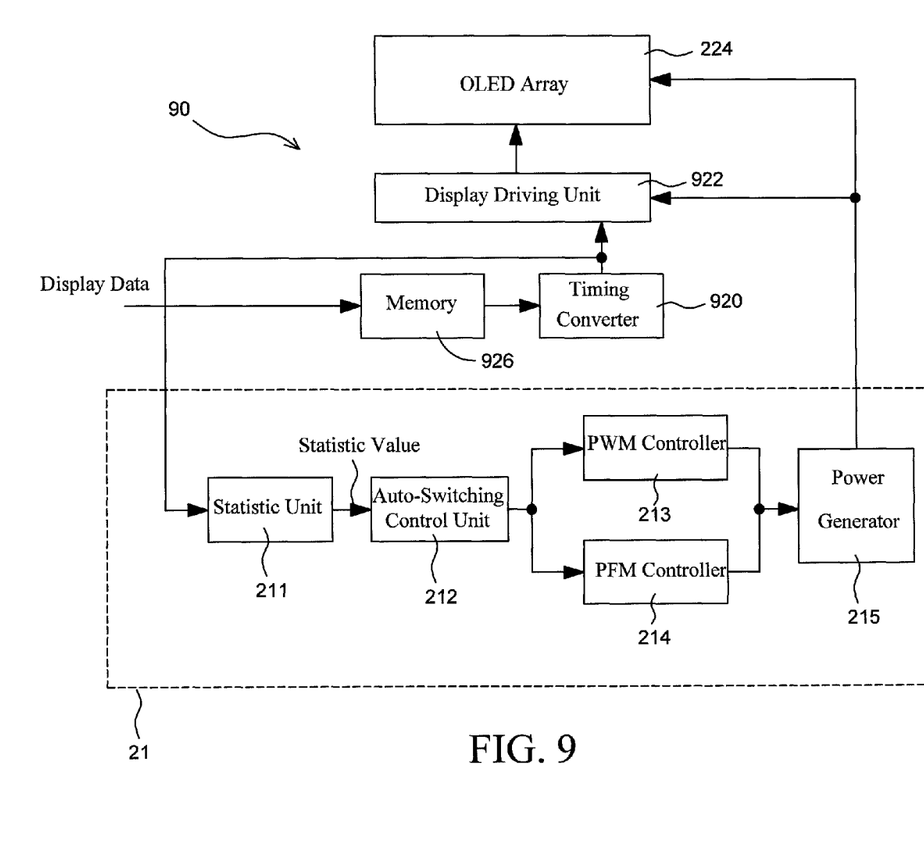
FIG. 9 shows the architecture of an OLED display with the built-in DC-DC converter according to the third embodiment of the invention.

FIG. 9 shows the architecture of an OLED display 90 with the built-in DC-DC converter according to the third embodiment of the invention. Referring to FIG. 9, the OLED display 90 includes a DC-DC converter 21 with auto-switching between PWM and PFM, a timing converter 920, a display driving unit 922, a memory 926 and an OLED array 224. The DC-DC converter 21 of this embodiment is the same as the DC-DC converter 21 of the OLED display 80 of the second embodiment, so detailed descriptions thereof will be omitted. The difference between the OLED display 90 of this embodiment and the OLED display 80 of the second embodiment resides in that the data of the display driving unit 922 is provided by the timing converter 920. Thus, the DC-DC converter 21 receives the data outputted from the timing converter 920. Because the timing converter 920, the memory 926, the display driving unit 922 and the OLED array 224 have the architectures that can be found in the typical OLD display, detailed descriptions thereof will be omitted.

Because the DC-DC converter 21 of the invention directly controls the switching between PWM and PFM directly according to the display data without feeding the current load (i.e., the consumed current of the OLED array) back to the DC-DC converter, the architecture of the invention is simpler than that of the prior art, in which the feedback method is adopted.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications. For example, an additional set of memories may further be added to the OLED display to serve as the buffer for the display data so that the DC-DC converter can firstly read the display data in the buffer and the PWM/PFM mode may be adjusted immediately.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A DC-DC converter with auto-switching between pulse width modulation (PWM) and pulse frequency modulation (PFM), for providing a power voltage to an organic light emitting diode (OLED) display, the DC-DC converter comprising:
    a content statistic unit, for accumulating display data from the OLED display and then outputting a statistic value, wherein the display data represent a luminance of each pixel, and the statistic value represents an average power consumption of a display period;
    an auto-switching control unit, for generating a switch control signal according to the statistic value, wherein the switch control signal has a first state and a second state;
    a PWM controller, for generating a PWM power when the switch control signal is in the first state, wherein the PWM power is adapted for driving a heavy load;
    a PFM controller, for generating a PFM power when the switch control signal is in the second state, wherein the PFM power is adapted for driving a light load; and
    a power generator, coupled to the PWM controller and the PFM controller, for outputting the PWM power or the PFM power as the power voltage, wherein the PWM power is outputted when the statistic value is higher than a preset value, which represents the OLED display will operate in the heavy load, and the PFM power is outputted when the statistic value is lower than the preset value, which represents the OLED display will operate in the light load,
    wherein the content statistic unit comprises:
    a look-up-table, for recording a weighting corresponding to power consumption of each pixel value, and thus outputting a corresponding weighting according to the display data;
    a multiplier, for receiving the display data and the weighting and thus outputting weighting data;
    a register; and
    an adder, for receiving the weighting data, adding the weighting data to a stored value of the register to generate an added value, and storing the added value back to the register; and
    wherein the content statistic unit further receives a vertical sync signal, outputs the stored value of the register as the statistic value when the vertical sync signal is enabled, and then clears the stored value of the register.

2. The DC-DC converter according to claim 1, wherein the auto-switching control unit comprises a comparator, wherein the switch control signal is set into the first state when the statistic value is higher than or equal to a threshold value, otherwise the switch control signal is set into the second state.

3. The DC-DC converter according to claim 1, wherein the auto-switching control unit sets the switch control signal into the second state when the switch control signal is set into the first state and the statistic value is lower than a first threshold value, and sets the switch control signal into the first state when the switch control signal is set into the second state and the statistic value is higher than a second threshold value.

4. A organic light emitting diode (OLED) display, comprising:
   a timing converter, for receiving display data and adjusting a timing of the display data, and then outputting the display data and a control signal;
   a display driving unit, coupled to the timing converter, for outputting a driving signal;
   an OLED array, coupled to the display driving unit, for displaying a frame according to the driving signal; and
   a DC-DC converter with auto-switching between pulse width modulation (PWM) and pulse frequency modulation (PFM), for generating a power voltage to the OLED array and comprising:
   a content statistic unit, for accumulating display data from the OLED display and then outputting a statistic value, wherein the display data represent a luminance of each pixel, and the statistic value represent a average power consumption of a display period;
   an auto-switching control unit, for generating a switch control signal according to the statistic value, wherein the switch control signal has a first state and a second state;
   a PWM controller, for generating a PWM power when the switch control signal is in the first state, wherein the PWM power is adapted for driving a heavy load;
   a PFM controller, for generating a PFM power when the switch control signal is in the second state, wherein the PFM power is adapted for driving a light load; and
   a power generator, coupled to the PWM controller and the PFM controller, for outputting the PWM power or the PFM power as the power voltage, wherein the PWM power is outputted when the statistic value is higher than a preset value, which represents the OLED display will operate in the heavy load, and the PFM power is outputted when the statistic value is lower than the preset value, which represents the OLED display will operate in the light load,
   wherein the content statistic unit comprises:
   a look-up-table, for recording a weighting corresponding to power consumption of each pixel value, and thus outputting a corresponding weighting according to the display data;
   a multiplier, for receiving the display data and the weighting and thus outputting weighting data;
   a register; and
   an adder, for receiving the weighting data, adding the weighting data to a stored value of the register to generate an added value, and storing the added value back to the register; and
   wherein the content statistic unit further receives a vertical sync signal, outputs the stored value of the register as the statistic value when the vertical sync signal is enabled, and then clears the stored value of the register.

* * * * *